United States Patent [19]

Kato et al.

[11] 4,129,291

[45] Dec. 12, 1978

[54] TWO-DIMENSIONAL PRECISION TABLE

[75] Inventors: Shigeo Kato, Mitaka; Osamu Morita, Hachioji; Sadao Matuoka, Kanagawa, all of Japan

[73] Assignee: Hitachi, Ltd., Japan

[21] Appl. No.: 818,743

[22] Filed: Jul. 25, 1977

[30] Foreign Application Priority Data

Jul. 23, 1976 [JP]  Japan ................................ 51/87294

[51] Int. Cl.$^2$ ............................................. B23Q 1/02
[52] U.S. Cl. ....................................................... 269/73
[58] Field of Search ...................................... 269/71–73, 269/35, 55; 308/3 A, DIG. 1; 33/1 M, 174 TA

[56] References Cited

U.S. PATENT DOCUMENTS

| | | | |
|---|---|---|---|
| 3,277,696 | 10/1966 | Gertel | 308/DIG. 1 |
| 3,863,995 | 2/1975 | Jones | 308/3 A |
| 4,026,536 | 5/1977 | Netto | 269/73 |

Primary Examiner—Robert C. Watson
Attorney, Agent, or Firm—Craig & Antonelli

[57] ABSTRACT

A precision table for a machine tool or the like, which table mounts a workpiece and is adapted to be selectively moved or slid in two directions by a low viscosity bearing such as an externally pressurized air bearing. The bearing includes at least one guide of a substantially J-shaped cross-sectional configuration with a jet arrangement being provided within the guide for jetting a pressurized gas through at least one orifice toward at least one internal surface of the guide. The jet arrangement is disposed within the guide which is fixedly arranged on a flat surface of a bed so that the table is supported by an air film in a clearance between the jet arrangement and portions of the guide.

27 Claims, 6 Drawing Figures

TWO-DIMENSIONAL PRECISION TABLE

BACKGROUND OF THE INVENTION

The present invention relates to a machining tool and, more particularly, to a precision table for use in a machine tool such as a multi-dimensional measuring machine, a surface grinder, or the like, in which a precision table is mounted for selective movement in two directions.

A conventional machine tool table arrangement movable in two directions or dimensions is illustrated in FIG. 1 and includes a so-called V-flat slide bearing. A bed 101, in general, made of castings, is provided with an upper surface in which is disposed a groove 102 having a V-shaped cross-sectional configuration with a flat portion 103 being provided at a position spaced from the V-shaped groove 102. Both the V-shaped groove 102 and the flat portion 103 are machined or worked by scraping with a lubricating oil being stored in a minute concave portion which has been scraped. A saddle 104 is provided which includes along a lower edge thereof a V-shaped projecting portion 105 and a flat portion 106 which are adapted to engage the V-shaped groove 102 and flat portion 103 of the bed 101.

The disposition or positioning of the saddle 104 is regulated by the V-shaped groove 102 of the bed 101 so as to permit the saddle 104 to be displaced linearly. A further V-shaped groove 107 is formed on an upper portion of the saddle 104 with a flat portion 108 being provided on the saddle 104 at a position spaced from the V-shaped groove. The groove 107 is similar to the V-shaped groove 102 as are the flat portions 103 and 108. The V-shaped groove 102 and flat portions 103 provided on the upper surface of the bed 101 extend in a direction perpendicular to the V-shaped groove 107 and flat portion 108 provided on the saddle 104.

A workpiece receiving table 109 is provided having arranged on a lower portion thereof a V-shaped projection 110 and a flat portion 111 which correspond to the V-shaped groove 107 and flat portion 108 of the saddle 104, respectively. The table 109 is arranged so as to be displaceable in the V-shaped groove 107 of the saddle 104 so as to execute linear motion.

In the conventional construction of FIG. 1, the table 109 and saddle 104 can be moved in independent directions and, as a result thereof, the table 109 can be moved in two directions, that is, can execute a planar motion. This type of two-dimensional table is used in a wide variety of machine tools such as, for example, milling machines, surface grinders, or the like, as well as measuring instruments such as a three-dimensional measuring apparatus, photo-repeater or the like, as well as on a precision instrument.

While the proposed conventional table may be easily constructed, one disadvantage in such construction resides in the fact that the table is moved through a slide bearing in which the bearing portions are brought into metal contact with each other.

A further disadvantage of the proposed conventional table resides in the fact that the corresponding bearing portions, that is, the V-shaped groove, V-shaped projection and flat portions, respectively, are in engagement when stopped so that static friction is considerable such that a relatively large application of power is necessary to move the table or saddle from a stopped condition.

Another disadvantage of the conventional table resides in the fact that once the table and saddle are moved, the power necessary to move them can be reduced since the table and saddle are lifted by the lubricating oil; however, the power required to move the table or the saddle varies greatly. Thus, in the proposed table, not only is a smooth movement of the table difficult, but also a precise positioning of the table may not easily be obtained.

Yet another disadvantage of the conventional machine table resides in the fact that the lifting in the table which arises when moving may cause an error in upward or downward direction of the table. The lifting quantity is a large value of 2–5 $\mu$m. Consequently, in the conventional table, it would not be possible to provide a construction which would be capable of performing a planar motion at an error of less than 1$\mu$m by virtue of the presence of the above-noted lifting error.

Still another disadvantage of the proposed conventional table resides in the fact that the corresponding bearing portions are in metal contact so that considerable wear arises whereby, in a short period of time, the precision of the planar motion of the table is adversely affected.

SUMMARY OF THE INVENTION

The aim underlying the present invention essentially resides in providing a precision table for a machine tool which is selectively movable in two directions so as to be capable of performing a very high precise planar motion.

According to one feature of the present invention, an externally pressurized gas bearing is provided in which, for example, air with a vary low viscosity is used as a lubricating material with the pressure of the air bearing being controlled so as to obtain a high precision in the planar motion of the precision table.

According to another feature of the present invention, at least one jetting means for a pressurized gas is arranged within a guide means having a substantially J-shaped cross-sectional configuration with the jetting means being fashioned as a hollow member or plate which is surrounded by an air film which is formed by the pressurized gas jetting from each orifice at a constant pressure. The jetting gas contacts upper, lower and side surfaces of the guide means so as to support the hollow member or plate at a constant distance from a facing internal surface of the guide means.

According to a still further feature of the present invention, the members forming the guide means and the hollow members or plates of the jetting means are provided with parallel surfaces so that such members can be made with high precision and low cost. Moreover, the members are constructed so as to be thin and square or angular so that the portion of the bearing means, in accordance with the present invention, can be constructed with high volume efficiency and also can be constructed compactly.

Accordingly, it is an object of the present invention to provide a two-dimensional precision table for a machine tool which avoids, by simple means, the aforementioned drawbacks and disadvantages encountered in the prior art.

A further object of the present invention resides in providing a two-dimensional precision table which can perform a very precise planar motion.

Yet another object of the present invention resides in providing a two-dimensional precision table which eliminates metal contact between the slide bearings of the respective elements of the table.

A still further object of the present invention resides in providing a precision table which includes jet means which are completely floated within respective guide means at a constant clearance so as to minimize, if not avoid, any wear in the bearings, thereby providing a bearing construction having a life which is semipermanent.

Yet another object of the present invention resides in providing a precision table for a machine tool wherein the power required to move a saddle and the table is reduced and may be constantly maintained so that a positioning thereof can readily be performed.

A still further object of the present invention resides in providing a precision table for a machine tool which includes an externally pressurized air bearing supporting the precision table so as to permit the table to perform a planar motion with a high degree of flatness.

Still another object of the present invention resides in providing a precision table for machine tools in which a clearance between mutual sliding surfaces in the bearing means is less than 1μm and is in the order of 0.1μm.

A further object of the present invention resides in providing a precision table for a machine tool which is slightly and loosely fluctuated.

These and other objects, features and advantages of the present invention will become more apparent from the following description when taken in connection with the accompanying drawings which show, for the purposes of illustration only, several embodiments in accordance with the present invention, and wherein:

DETAILED DESCRIPTION OF THE PREFERRED EMBODIMENT

Figure 2:
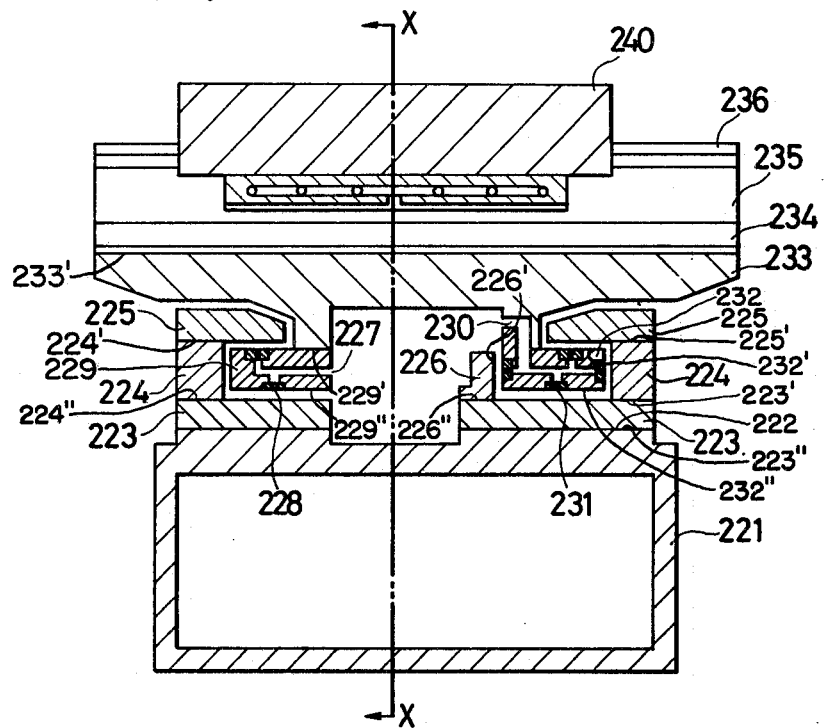
FIG. 2 is a frontal cross-sectional view illustrating a first embodiment of a machine tool table displaceable in two directions in accordance with the present invention.

Referring now to the drawings wherein like reference numerals are used throughout the various views to designate like parts and, more particularly, to FIG. 2, according to this figure, a precision table for a machine tool is provided which is displaceably guided for movement in two directions and includes a flat bed 221 having an upper surface 222, flattened by scraping, on which is fixedly superimposed a lower plate 223 provided with flat, parallely extending upper and lower surfaces 223', 223". Preferably, the upper and lower surfaces 223', 223" are finished by machining or working such as lapping or the like so that the respective surfaces have a surface roughness of about 3μm.

An intermediate plate 224 is fixedly arranged on the lower plate 223 and includes flat, parallely extending upper and lower surfaces 224', 224" with an upper plate 225 being provided with a lower surface 225" which is flat and smooth and which is fixedly secured to the upper surface 224' of the intermediate plate 224.

The lower plate 223, intermediate plate 224 and upper plate 225 define a substantially J-shaped guide means with a side plate 226 being fixedly secured to the upper surface 223' of the lower plate 223. The side plate 226 includes a lower surface 226' and an inside surface 226", each of which is flat and smooth with the lower surface 226' extending perpendicular to the inside surface 226".

By virtue of the J-shaped configuration of the guide means, it is possible for the machine tool precision table to be regulated upwardly and downwardly, as well as to the right and left in a manner explained more fully hereinbelow.

A jetting means is arranged within the guide means defined between the upper surface 223' of the lower plate 223, inside surface of the intermediate plate 224, and lower surface 225" of the upper plate 225, with the jetting means including a hollow member or plate 229 having smooth, flat, parallely extending upper and lower surfaces 229', 229", respectively, an inlet 227 connected, in a conventional manner, with a source of pressurized gas (not shown) through a flexible transport tube (not shown), and orifices 228 provided in the upper and lower surfaces 229', 229" for jetting a pressurized gas toward the surfaces 223', 225".

By the above-noted arrangement, the hollow member or plate 229 is supported by a gas film of, for example, air with high rigidity with the film extending in the narrow space or clearance formed between the upper plate 225 and lower plate 223 of the guide means so that the plate 229 can be moved strongly in an upward or downward direction, thereby regulating the positioning thereof.

The jetting means includes a further plate 232 arranged in the guide means defined between the upper surface 223' of the lower plate 223, inside surface of the intermediate plate 224, lower surface 225" of the upper plate 225 and inside surface 226" of the side plate 226 with the further plate 232 including upper and lower surfaces 232', 232", respectively, an inlet 230 connected, in a conventional manner, with a source of pressurized gas (not shown) through a flexible transport tube (not shown) and orifices 231 provided in the upper and lower surfaces 232', 232" and in both side surfaces of the hollow member or plate 232.

By this arrangement, the plate 232 is supported by an air film with high rigidity with the film extending in the narrow space or clearance formed between the lower plate 223, intermediate plate 224, upper plate 225 and side plate 226 so that the plate 232 may be moved upwardly and downwardly, as well as to the left and right, thereby regulating the positioning of the plate 232.

A saddle 233 is fixed to the upper surfaces 229' and 232' of the hollow members or plates 229, 232, respectively, with a further substantially J-shaped guide means being arranged on the upper surface 233' of the saddle 233. The further J-shaped guide means includes a lower plate 234, intermediate plate 235, and upper plate 236 which respectively correspond to the lower plate 223, intermediate plate 224 and upper plate 229. The further J-shaped guide means extends in a direction perpendicular to the first J-shaped guide means.

Figure 3:
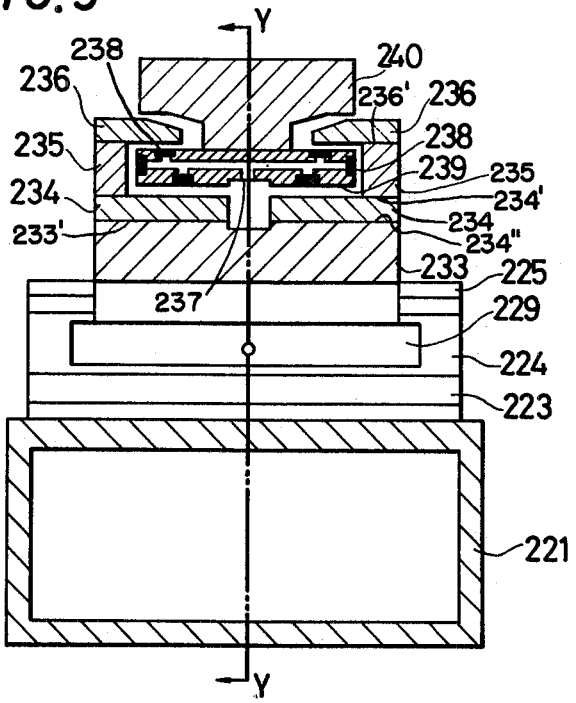
FIG. 3 is a cross-sectional side view taken along the line X—X of FIG. 2.

As shown in FIG. 3, the other lower plate 234 is fixedly superimposed on the upper surface 233' of the saddle 233 and includes flat, parallely extending upper and lower surfaces 234', 234". The other intermediate plate 235 includes flat, parallely extending upper and lower surfaces 235', 235" and side surfaces which extend perpendicular to the upper surface 234' of the lower plate 234. Intermediate plate 235 is fixedly arranged at the upper surface 234' of the lower plate 234.

The upper plate 236 includes a flat lower surface 236' which is fixedly arranged at the upper surface 235' of the intermediate plate 235 so that a guide means having a substantially J-shaped cross-sectional configuration is defined between the plates 234, 235 and 236.

A further jetting means is arranged within the guide means defined between the lower, intermediate and upper plates 234, 235 and 236, respectively, with the jetting means including a hollow member or plate 239 provided with flat, parallely extending upper and lower surfaces 239', 239" and spaced side surfaces which extend perpendicular to the upper and lower surfaces 239', 239". Orifices 238 are provided in the upper and lower surfaces 239', 239" as well as in the side surfaces of the hollow member or plate 239 so as to jet a pressurized gas toward internal surfaces of the guide means.

A table 240 is fixed to the hollow member or plate 239, which corresponds to the plate 229 or 232, so that the table 240 is movable in a clearance defined by the guide means in a manner described more fully hereinbelow.

The pressurized gas is supplied to the jetting means from a pressurized gas source (not shown) through a flexible transport tube (not shown) to an inlet 237 provided at the lower surface 239' of the hollow member or plate 239. By varying the pressure of the pressurized gas delivered to the inlet 237, the plate 239 is moved either upwardly or downwardly or to the right or to the left in dependence upon the pressure of the air film between the hollow member or plate 239 and the J-shaped guide means. A restoring force is applied on the J-shaped member or plate 239 so as to automatically restore the hollow member or plate 239 and therewith the table 240 to an original position.

Likewise, by varying the pressure of the pressurized gas to the inlets 227, 230, the hollow members or plates 229, 232 are moved either upwardly and downwardly or to the right and left in dependence upon the pressure of the air film in the clearance between the hollow members or plates 229, 232 and the associated elements defining the J-shaped guide means.

Preferably, in accordance with the present invention, the bearing clearance of the so-called externally pressurized air bearing formed between the respective jetting means and associated guide means which supports the table 240 and the saddle 233 is 10 to 20µm so that a much broader bearing clearance, as compared with conventional slide bearings, is obtained. Furthermore, the pressurized air bearing of the present invention eliminates the metal contact present in conventional slide bearings and the bearing area of the present invention is of a sufficient width so that the hollow members or plates 229, 232 and 239 can be moved in a straight manner without completely fluctuating upwardly and downwardly since the internal surface of the respective J-shaped guide means of the bearing means is uniform as a whole even if such surfaces have a local small concavity or convex portion thereon. Moreover, since the viscosity of the air in the air bearing is less than $10^{-3}$ of that of an oil, the frictional force which occurs in the bearing means of the present invention is very low and constant.

Figure 4:
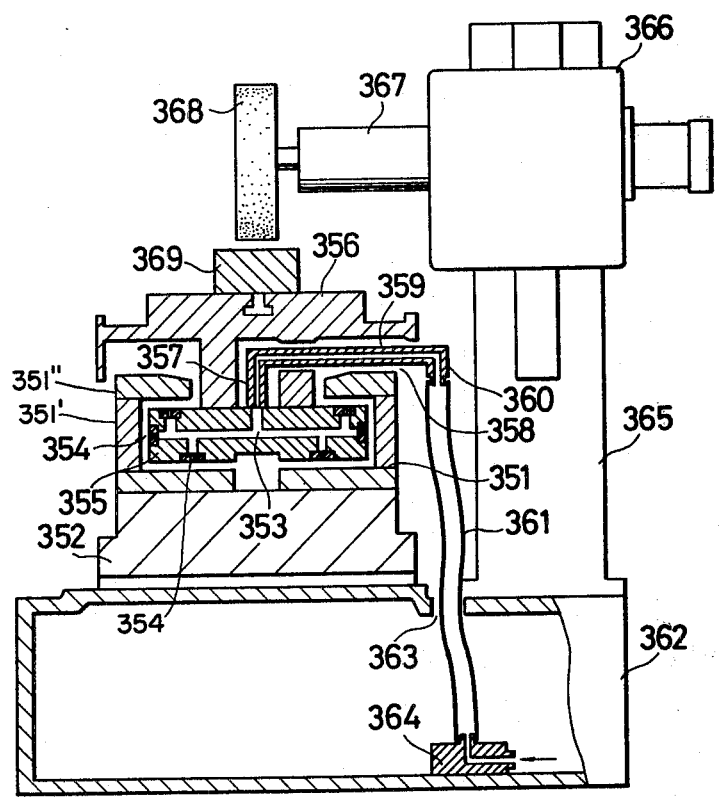
FIG. 4 is a partially schematic cross-sectional side view of a surface grinder arrangement which utilizes a two-dimensional precision table of the present invention as a working table.

As shown in FIG. 4, a surface grinder arrangement is provided which employs, as a work holding table, a precision table constructed in accordance with the present invention. Specifically, according to this figure, a guide means is provided having a substantially J-shaped cross-sectional configuration and includes a bottom plate 351, intermediate plate 351' secured to the bottom plate and an upper plate 351" secured to the intermediate plate 351'.

The bottom plate 351 is fixedly arranged on a saddle 352 mounted on a bed 362 so as to be displaceable in a leftward and rightward direction with respect to the figure. A hollow member or plate 355 is disposed within the guide means and is provided with a plurality of orifices 354 at the upper, lower and side surfaces thereof for jetting a pressurized gas against the interior surfaces of the guide means.

Pressurized gas such as, for example, air is supplied to the hollow member or plate 355 through a supply inlet 353 which is connected with a source of pressurized air (not shown) by way of a first air tube 357 fixed to the inlet 353, a second air tube 359 inserted into a hole or opening 358 provided in a side surface of the table 356, a nipple 360 fixed at the end of the second air tube 359, and a flexible air tube 361 having a first end connected to the nipple 360 and extending through an opening 363 provided on an upper surface of the bed 362 so as to permit a second end of the flexible air tube 361 to be connected to a transit or relay tube 364 provided within the bed 362. The gas from the pressurized source (not shown) is supplied to the transit or relay tube 364 with a constant pressure.

The hollow member or plate 351 is movable in directions into and out of the plane of FIG. 4 with the pressurized gas at a constant pressure supplied to the inlet 353 being jetted out from each of the orifices so as to form an air film with a high rigidity in a narrow space or clearance between the substantially J-shaped guide means and the hollow member or plate 355. The hollow member or plate 355 is floated by the elasticity of the air film with the hollow member or plate 355 being in a non-contact state from the elements of the guide means. Thus, a table 356 fixed on the hollow member or plate 355 is supported by a floating force.

In the construction of FIG. 4, the saddle 352 is movable to the right and to the left on the bed 362 and the table 356, installed on the saddle 352, is movable into and out of the plane of the figure due to the externally pressurized air bearing so that the precision table executes a two-dimensional planar motion as a whole. On the other hand, a grinding wheel 368, rotated by a wheel spindle 367, is installed on a spindle slider 366 which slides along a column 365 arranged on the bed 362 so that a workpiece 369 mounted on the table 356 can be highly precisely worked or machined by the grinding wheel 368.

Figure 5:
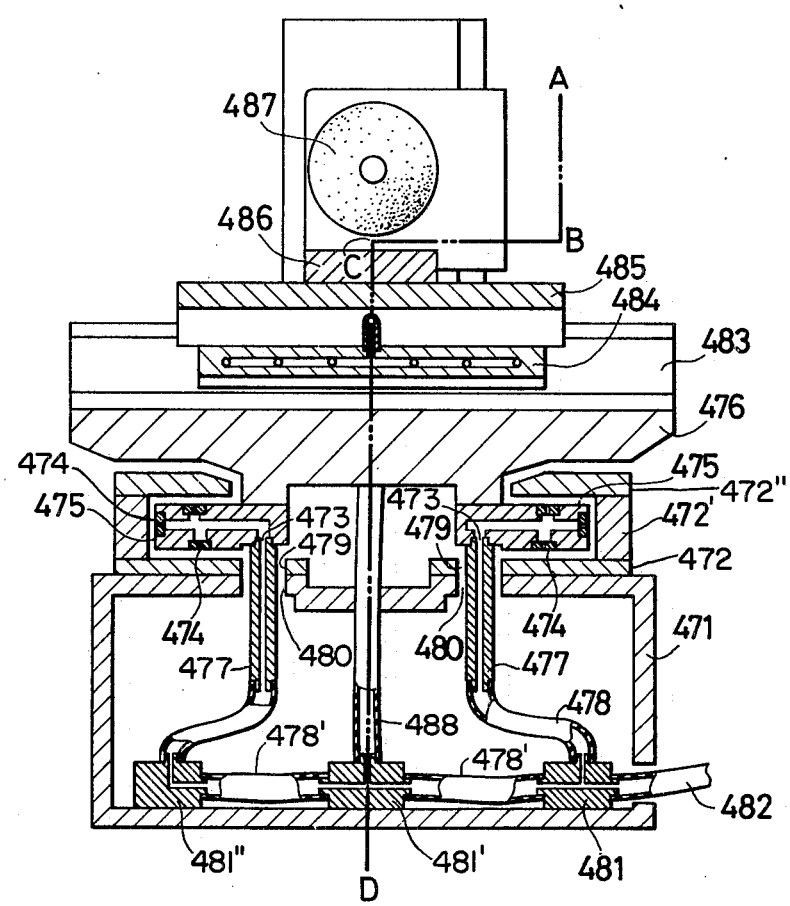
FIG. 5 is a partially schematic cross-sectional frontal view taken along the plane E-F-G-H of FIG. 6 illustrating a further surface grinder employing the precision table of the present invention.
Figure 6:
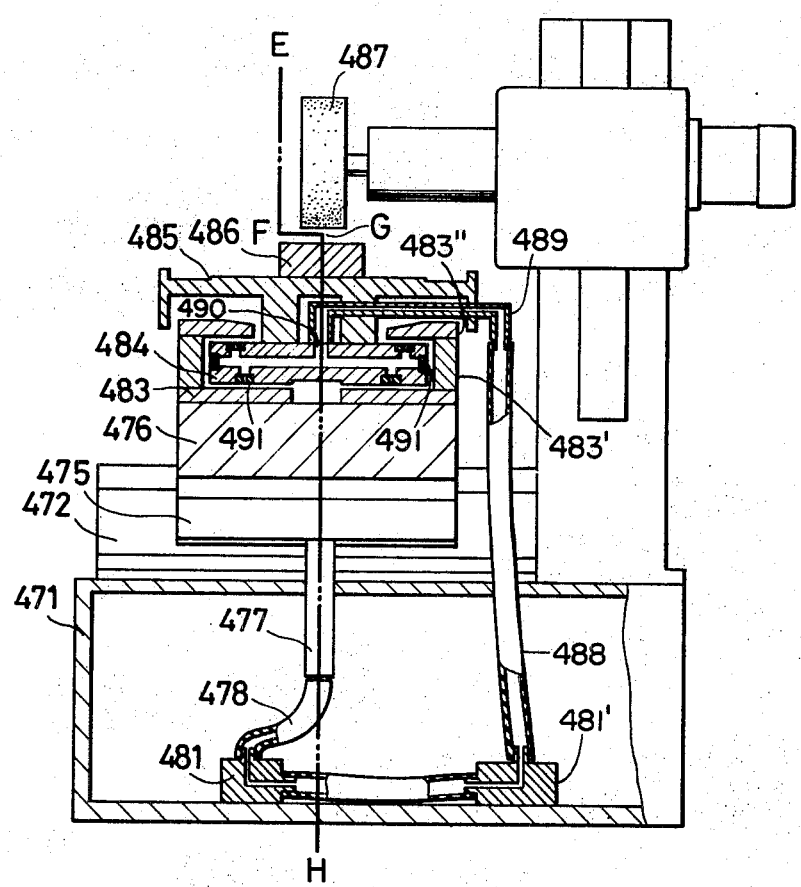
FIG. 6 is a partially schematic cross-sectional view taken along the plane A-B-C-D of FIG. 5.

FIGS. 5 and 6 provide a further example of a surface grinder arrangement which employs, as a work holding table, a precision table constructed in accordance with the present invention wherein the supplying means for supplying a pressurized gas to the jetting means differs from the embodiments described hereinabove. Specifically, according to these figures, a bottom plate 472 is fixedly arranged on a bed 471 with an intermediate plate 472' being fixedly arranged on the bottom plate 472 and a top plate 472" being fixedly arranged on the intermediate plate 472'. The plates 472, 472' and 472" define a substantially J-shaped guide means in which is accommodated a hollow member or plate 475 which is provided with a plurality of orifices 474 at the upper, lower and side surfaces thereof for jetting a pressurized gas against the interior surfaces of the guide means. The hollow member or plate 475 is arranged in the guide means so as to be displaceable into and out of the plane of FIG. 5.

Pressurized gas such as, for example, air is supplied at a constant pressure through the supply inlets 473 to the hollow member 475 so that the air is jetted out of each orifice 474 so as to cause the formation of an air film or layer in a narrow space formed between the elements of the guide means and the hollow member or plate 475 so that the hollow member or plate 475 is floated by an elastic force of the air film without contacting any of the surfaces of the elements defining the guide means.

A saddle 476 is fixedly arranged on the hollow member or plate 475 such that the saddle 476 is supported by the floating force of the air film and is regulated by the guide means, whereby the saddle 476 executes a straight or linear movement with high precision into and out of the plane of FIG. 5.

The supplying inlets 473 of the hollow member or plate 475 are each connected with a pressurized gas source (not shown) by way of first air tubes 477, second flexible air tubes 478 connected to the first air tubes 477 and transit or relay tubes 481, 481". Either a nipple or a cylindrical pipe may be employed as the first air tubes 477 and, in either case, preferably, the tube or pipe has a considerable length.

Gaps or openings 479, 480 are provided in the lower or bottom plates 472 and upper portion of the bed 471 so as to permit the first air tubes 477, connected to the hollow member or plate 475, to extend in a vertical plane downwardly into the interior of the bed 471. The relay or transit tubes 481 and 481" are arranged on an internal bottom wall surface of the bed 471 and are interconnected by a further relay or transit tube 481' and further flexible air tubes 478' to the source of pressurized gas (not shown) by way of a flexible conduit 482. The flexible conduit 482 supplies gas at a constant pressure to the hollow member or plate 475.

As shown most clearly in FIG. 6, another substantially J-shaped guide means is fixedly arranged on the saddle 476 and is defined by a lower or bottom plate 483 secured to the saddle 476, an intermediate plate 483' fixedly arranged at the lower plate 483 and an upper plate 483" fixedly arranged at the intermediate plate 483'. A hollow member or plate 484 is disposed within the guide means and is provided with a plurality of orifices 491 at the upper, lower and side surfaces thereof for jetting a pressurized gas against the interior surfaces of the guide means. The hollow member or plate 484 is arranged in the guide means so as to be movable by the operation of the externally pressurized air bearing in directions into and out of the plane of FIG. 6.

The gas with a constant pressure is supplied from a pressurized gas source (not shown) through conduit 482, relay or transit tube 481', flexible tube 488, air tube 489 and supply inlet 490 to the hollow member or plate 484 with the so-supplied gas being jetted through the orifices so as to form an air film with a high rigidity in the narrow space or clearance between the guide means and hollow member or plate 484. If desired, the gas with a constant pressure may be supplied to the hollow member or plate 484 from a different pressurized gas source than the source supplying hollow member or plate 475.

A table 485 is fixedly mounted on the hollow member or plate 484 with a workpiece 486 mounted on the table 495 so as to be machined or worked by a grinding wheel 487 in a manner fully described hereinabove in connection with FIG. 4.

Figure 1:
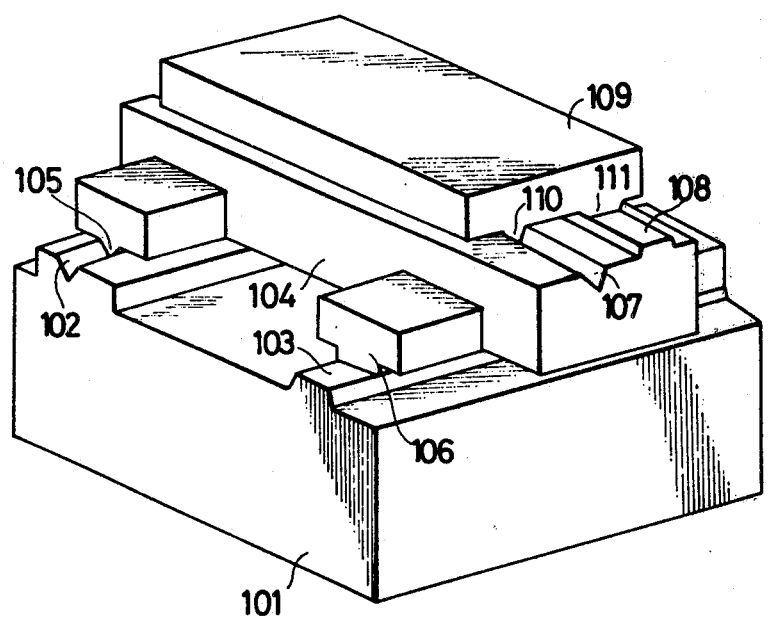
FIG. 1 is a schematic rear perspective view of a conventional construction of a machine tool table displaceable in two dimensions.

With a conventional machining or working table having V-flat slide bearings such as described above and illustrated in FIG. 1, when employed with a surface grinder, it has not been possible to provide a workpiece with a surface roughness of $0.2\mu m$. However, when the precision table of the present invention is employed with a surface grinder, it is possible to obtain a workpiece having a surface roughness of less than $0.02\mu m$. Consequently, by virtue of the present invention, the obtaining of a precision of more than ten times the precision of conventional work tables is greatly facilitated.

Moreover, in conventional two-dimensional work tables, the straightness has been at most $2\mu m/100$ mm. However, by virtue of the construction of the present invention, a straightness of $0.3\mu m/200$ mm can easily be obtained.

By virtue of the present invention, the working precision can be markedly improved. Further, the present invention can be employed not only with a surface grinder, but also with a photo-repeater, a three-dimensional measuring instrument or the like. Thus, the two-dimensional precision table of the present invention is widely applicable and can perform a planar movement with ultra precision so as to provide for a significant industrial impact.

While we have shown and described several embodiments of the present invention, it is understood that the same in not limited thereto, but is susceptible of numerous changes and modifications as known to those skilled in the art, and we therefor do not wish to be limited to the details shown and described herein, but intend to cover all such changes and modifications as are encompassed by the scope of the appended claims.

We claim:

1. A table arrangement for precision working of a workpiece, the arrangement comprising:
   a rigid support means,
   means for accommodating a workpiece, and
   means for mounting said accommodating means at said rigid support means so as to permit said accommodating means to be selectively displaceable in two directions,
   said mounting means including an externally supplied pressurized gas bearing means for providing a gas film between portions of said rigid support means and said accommodating means,
   said gas bearing means includes at least one guide means arranged on said rigid support means, said guide means having a plurality of spaced internal guide surfaces arranged so as to define a substantially J-shaped guide opening, and
   gas jet means arranged within said guide means for directing at least one jet of a gas toward at least one internal guide surface of said guide means,
   said gas jet means being dimensioned such that a clearance is provided between an outer surface thereof and the internal guide surfaces of said guide means, the at least one jet of gas from said gas jet means forming the gas film in the clearance between the gas jet means and said guide means.

2. The arrangement according to claim 1, wherein said gas jet means includes a rectangular-shaped member, and wherein means are provided in portions of said member for discharging jets of pressurized gas.

3. The arrangement according to claim 2, wherein said member is box-shaped and includes a plurality of outer surfaces, and wherein the internal surfaces of said guide means are parallel to a top, a side and a bottom outer surface of said box-shaped member.

4. The arrangement according to claim 3, wherein said box-shaped member is a hollow member, and wherein said discharging means includes a plurality of discharge orifices communicating with an interior space of the hollow member and the clearance between the gas jet means and the guide means, and at least one supply inlet means is provided on said hollow member for communicating the interior thereof with a pressurized gas source.

5. A table arrangement for precision working of a workpiece, the arrangement comprising:
a rigid support means,
means for accommodating a workpiece, and
means for mounting said accommodating means at said rigid support means so as to permit said accommodating means to be selectively displaceable in two directions,
said mounting means including an externally supplied pressurized gas bearing means for providing a gas film between portions of said rigid support means and said accommodating means,
said pressurized gas bearing means includes a first bearing means and a second bearing means,
each of said guide means including spaced internal surfaces arranged so as to define a substantially J-shaped guide opening, and
a gas jet means arranged within each of said guide means for directing at least one jet of a gas toward at least one internal guide surface of an associated guide means,
each of said gas jet means being dimensioned such that a clearance is provided between an outer surface thereof and the internal guide surfaces of an associated guide means,
the at least one jet of gas from said gas jet means forming the gas film in the clearance between the gas jet means and an associated guide means.

6. The arrangement according to claim 5, wherein said guide means are perpendicular to each other.

7. The arrangement according to claim 6, wherein each of said gas jet means includes a rectangular-shaped member, and wherein means are provided in portions of said member for discharging jets of pressurized gas.

8. The arrangement according to claim 7, wherein each of said members is box-shaped and includes a plurality of outer surfaces, and wherein the internal surfaces of said guide means are parallel to a top, a side, and a bottom outer surface of an associated box-shaped member.

9. The arrangement according to claim 8, wherein each of said box-shaped members is a hollow member, and wherein said discharging means includes a plurality of discharge orifices communicating with an interior space of the hollow member and the clearance between the gas jet means and associated guide means, and wherein each of said hollow members includes at least one supply inlet for communicating the interior thereof with a pressurized gas source.

10. A table arrangement for precision working of a workpiece, the arrangement comprising:
a rigid support means,
means for accommodating a workpiece, and
means for mounting said accommodating means at said rigid support means so as to permit said accommodating means to be selectively displaceable in two directions,
said mounting means including an externally supplied pressurized gas bearing means for providing a gas film between portions of said rigid support means and said accommodating means;
said rigid support means includes a support bed,
said means for accommodating a workpiece includes a support table, and
said pressurized gas bearing means includes a guide means arranged on said support bed, said guide means including a first plate member mounted on said support bed, a second plate member mounted on said first plate member, and a third plate member mounted on said second plate member,
said first, second and third plate members being arranged so as to define a substantially J-shaped guide opening, and
a gas jet means displaceably mounted within said guide means for directing at least one jet of a gas toward at least one internal guide surface of said guide means,
said gas jet means being dimensioned such that a clearance is provided between an outer surface thereof and internal guide surfaces of said guide means,
the at least one jet of gas forming the gas film in the clearance between the gas jet means and said guide means.

11. The arrangement according to claim 10, wherein said gas jet means includes a hollow box-shaped member provided with a plurality of discharge orifice means communicating an interior of said hollow member with the clearance between the gas jet means and said guide means, and wherein at least one supply inlet means is provided on said hollow member for communicating the interior thereof with a pressurized gas source.

12. The arrangement according to claim 11, wherein said mounting means further includes a saddle means fixedly arranged on an upper surface of said hollow member and a further externally supplied pressurized gas bearing means interposed between said saddle means and said support table.

13. The arrangement according to claim 12, wherein said further externally supplied pressurized gas bearing means includes a further guide means arranged on said saddle means, said further guide means including a first plate member mounted on said saddle means, a second plate member mounted on said first plate member and a third plate member mounted on said second plate member, said first, second and third plate members being arranged so as to define a substantially J-shaped guide opening, and wherein a further gas jet means is displaceably mounted within said further guide means for directing at least one jet of a gas toward at least one internal guide surface of said further guide means, said further gas jet means being dimensioned such that a clearance is provided between an outer surface thereof and internal guide surfaces of said further guide means, the at least one jet of gas forming the gas film in the clearance between the further gas jet means and said further guide means.

14. The arrangement according to claim 13, wherein said further gas jet means includes a further hollow box-shaped member provided with a plurality of discharge orifice means communicating an interior of said further hollow member with the clearance between the further gas jet means and said further guide means, and wherein at least one supply inlet means is provided on said further hollow member for communicating the interior thereof with a pressurized gas source.

15. The arrangement according to claim 14, wherein said guide means and said further guide means are perpendicular to each other.

16. The arrangement according to claim 15, wherein said support table is fixedly mounted on an upper surface of said further hollow member.

17. The arrangement according to claim 1, wherein each of said gas jet means includes a box-shaped member having a plurality of outer surfaces, and wherein the internal surfaces of said guide means are parallel to a top, a side, and a bottom outer surface of said box-shaped member.

18. The arrangement according to claim 17, wherein said box-shaped member is a hollow member, and wherein a plurality of discharge orifices are provided in the hollow member for communicating an interior space of the hollow member with the clearance between the gas jet means and the guide means, and means are provided on said hollow member for communicating the interior thereof with a pressurized gas source.

19. The arrangement according to claim 5, wherein each of said gas jet means includes a rectangular-shaped member, and wherein means are provided in portions of said member for discharging jets of pressurized gas.

20. The arrangement according to claim 5, wherein each of said gas jet means includes a box-shaped member having a plurality of outer surfaces, and wherein the internal surfaces of said guide means are parallel to a top, a side, and a bottom outer surface of an associated box-shaped member.

21. The arrangement according to claim 20, wherein each of said box-shaped members is a hollow member, and wherein a plurality of discharge orifices are provided in the hollow member for communicating an interior space of the hollow member with the clearance between the gas jet means and associated guide means, and wherein means are provided on said hollow members for communicating the interior thereof with a pressurized gas source.

22. The arrangement according to claim 10, wherein said mounting means further includes a saddle means fixedly arranged on an upper surface of said gas jet means and a further externally supplied pressurized gas bearing means interposed between said saddle means and said support table.

23. The arrangement according to claim 22, wherein said further externally supplied pressurized gas bearing means includes a further guide means arranged on said saddle means, said further guide means including a first plate mounted on said saddle means, a second plate member mounted on said first plate member, and a third plate member mounted on said second plate member, said first, second and third plate members being arranged so as to define a substantially J-shaped guide opening, and wherein a further gas jet means is displaceably mounted within said further guide means for directing at least one jet of a gas toward at least one internal guide surface of said further guide means, said further gas jet means being dimensioned such that a clearance is provided between an outer surface thereof and internal guide surfaces of said further guide means, said at least one jet of gas forming the gas film in the clearance between the further gas jet means and said further guide means.

24. The arrangement according to claim 23, wherein said further gas jet means includes a further hollow box-shaped member provided with a plurality of discharge orifice means communicating an interior of said further hollow member with the clearance between the further gas jet means and said further guide means, and wherein at least one supply inlet means is provided on said further hollow member for communicating the interior thereof with a pressurized gas source.

25. The arrangement according to claim 24, wherein said guide means and said further guide means are perpendicular to each other.

26. The arrangement according to claim 25, wherein said support table is fixedly mounted on an upper surface of said further hollow member.

27. The arrangement according to claim 14, wherein said support table is fixedly mounted on an upper surface of said further hollow member.

* * * * *